No. 794,666.    PATENTED JULY 11, 1905.
M. J. DAVIN.
AUTOMOBILE.
APPLICATION FILED OCT. 10, 1904.
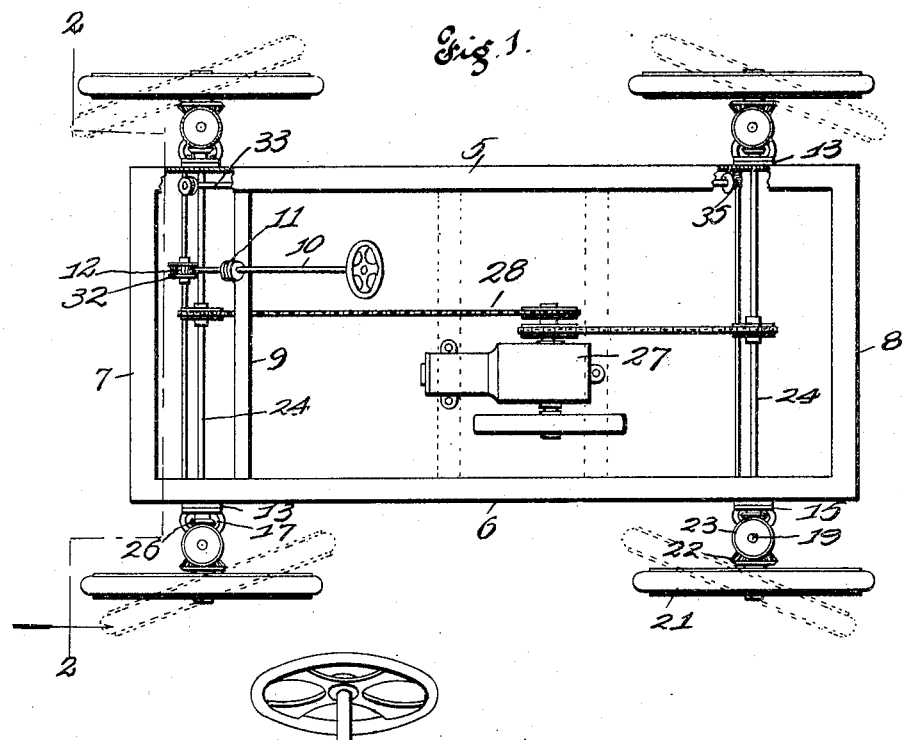
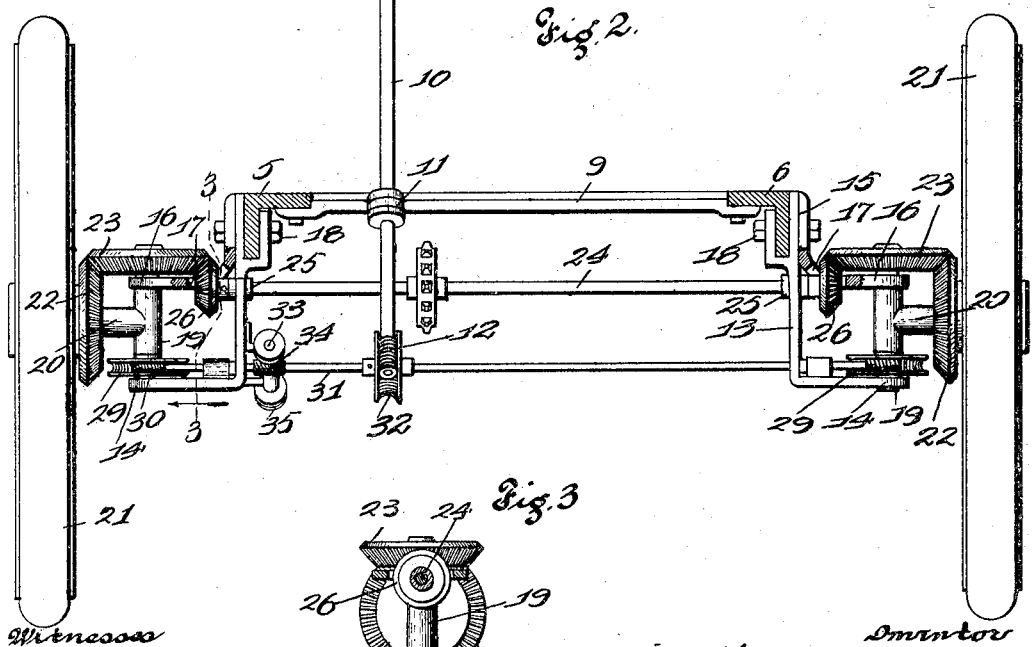

No. 794,666. Patented July 11, 1905.

UNITED STATES PATENT OFFICE.

MICHAEL J. DAVIN, OF ST. LOUIS, MISSOURI.

AUTOMOBILE.

SPECIFICATION forming part of Letters Patent No. 794,666, dated July 11, 1905.

Application filed October 10, 1904. Serial No. 227,917.

*To all whom it may concern:*

Be it known that I, MICHAEL J. DAVIN, a citizen of the United States, and a resident of St. Louis, Missouri, have invented certain new and useful Improvements in Automobiles, of which the following is a specification containing a full, clear, and exact description, reference being had to the accompanying drawings, forming a part hereof.

My invention relates to improvements in automobiles; and it consists of the novel features herein shown, described, and claimed.

In the drawings, Figure 1 is a top plan of an automobile running-gear embodying the principles of my invention. Fig. 2 is a cross-section on the line 2 2 of Fig. 1 and looking in the direction indicated by the arrow. Fig. 3 is a sectional detail on the line 3 3 of Fig. 2 and looking in the direction indicated by the arrow, the traction-wheel being omitted.

My object is to provide means of driving and steering the four wheels of an automobile.

Referring to the drawings in detail, the main frame or body of the automobile comprises the side bars 5 and 6 and the end bars 7 and 8, constructed of angle-iron and welded together to form a rectangle, as shown in Fig. 1. A steering-post brace 9 is inserted between the bars 5 and 6 near their forward ends, and the steering-post 10 is mounted in a bearing 11, carried by the brace 9, there being a steering-post worm 12 at the lower end of the steering-post, wheel-supporting brackets extending downwardly and outwardly at each corner of the frame, each of said wheel-supporting brackets comprising the lower bracket-arm 13, bifurcated at its upper end to receive the vertical web of the side bar and turned to a horizontal plane at its lower end, there being a swivel-bearing 14 at the outer lower end of the arm, and the upper bracket-arm 15, placed against the outer face and upper end of the arm 14 and extending outwardly, there being a swivel-bearing 16 at the outer end of said arm, said bearings 14 and 16 being in vertical alinement, there being a gear-opening 17 inside of the bearing 16, and a bolt 18, inserted through the upper ends of the arms 13 and 15 and through the vertical web of the side bar. The wheel swivel-post 19 is mounted with its ends in the bearings 14 and 16, and the axle 20 extends outwardly from the center of the post between the bearings.

The traction-wheels 21 are mounted upon the axles 20, and the beveled gears 22 are fixed upon the inner ends of the hubs of the wheels. Idler beveled gears 23 are loosely mounted upon the upper end of the swivel-post 19 in mesh with the gear 22. Driving-shafts 24 are loosely mounted in bearings 25 through the arms 13, and beveled gears 26 are fixed upon the ends of the shafts in mesh with the idlers 23, said beveled gears 26 operating in the openings 17 in the arms 15. The engine 27 is connected to the shafts 24 by sprockets and chains 28, so as to drive the shafts. Worm-gear segments 29 are fixed upon the lower ends of the swivel-posts 19, and the worm-gears 30, carried by the worm-gear shafts 31, mesh with the segments, there being a worm-gear 32 upon the forward shaft 31 in mesh with the worm-gear 12. The worm-gears 30 are right and left threads, so that as the steering-post 10 is operated the traction-wheels are turned to guide the automobile. A connecting-shaft 33 connects the forward shaft 31 to the rear shaft 31 by a worm-gear 34 at its forward end and a similar worm-gear 35 at its lower end, the gears 34 and 35 operating in opposite directions, so that as the forward traction-wheels are turned in one direction the rear traction-wheels are turned in the opposite direction, as shown in dotted lines in Fig. 1. As the traction-wheels are turned one way or the other the gears 22 travel in lines concentric to the post 19, upon which the gears 23 are mounted, so that the traction-wheels may be driven in any desired direction.

I claim—

In an automobile: a suitable frame; traction-wheel brackets extending from the four corners of the frame; swivel-posts mounted vertically in the brackets; axles extending horizontally from the swivel-posts; traction-wheels upon the axles; gears fixed upon the hubs of the traction-wheels; idler-gears upon the swivel-posts in mesh with the traction-wheel gears; and means for driving the idler-gears; worm-gear segments upon the swivel-posts; a worm-gear shaft for the front axles; worm-gears upon the worm-gear shaft in mesh with the front worm-gear segments; and steering-post; a third worm-gear upon the worm-gear shaft; a worm-gear upon the steering-post in mesh with the third worm-gear; a worm-gear shaft for the rear axles; worm-gears upon the rear swivel-posts; worm-gears upon the rear worm-gear shaft in mesh with the rear swivel-post worm-gears; a connecting-shaft; and worm-gears at the ends of the connecting-shaft to connect the forward worm-gear shaft to the rear worm-gear shaft.

In testimony whereof I have signed my name to this specification in presence of two subscribing witnesses.

MICHAEL J. DAVIN.

Witnesses:
ALFRED A. EICKS,
EDW. M. HARRINGTON.